Sept. 23, 1969     ICHIZO TSURUMOTO     3,468,148
MACHINES FOR MANUFACTURING SPRING WASHER
Filed Dec. 17, 1965     4 Sheets-Sheet 1
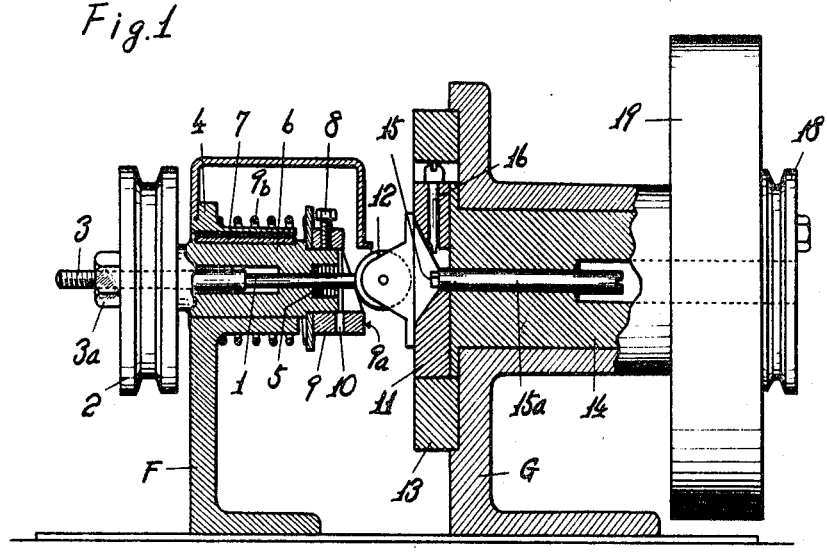
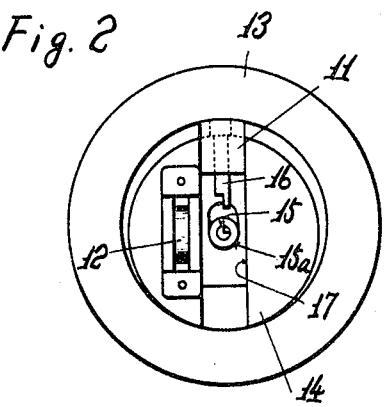
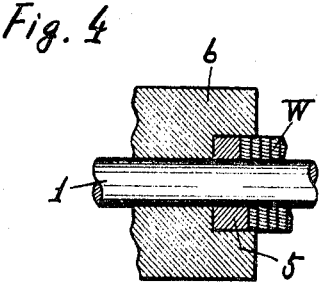
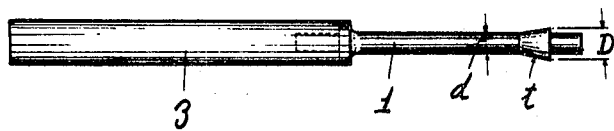

Sept. 23, 1969 ICHIZO TSURUMOTO 3,468,148
MACHINES FOR MANUFACTURING SPRING WASHER
Filed Dec. 17, 1965 4 Sheets-Sheet 2

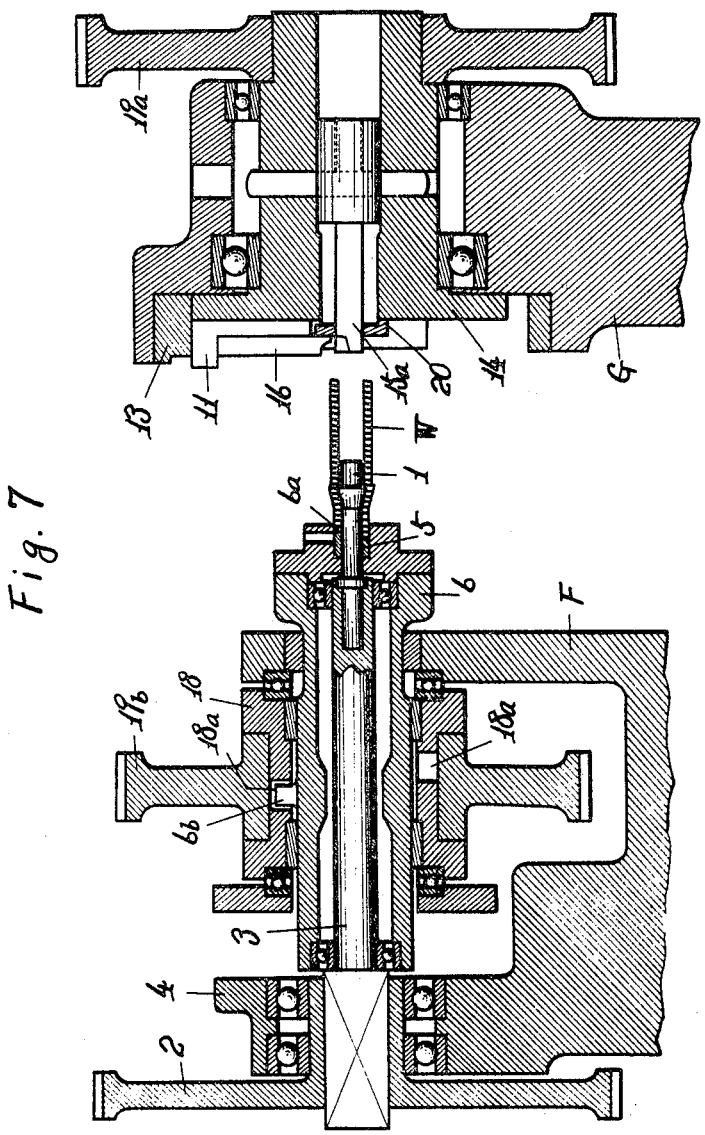

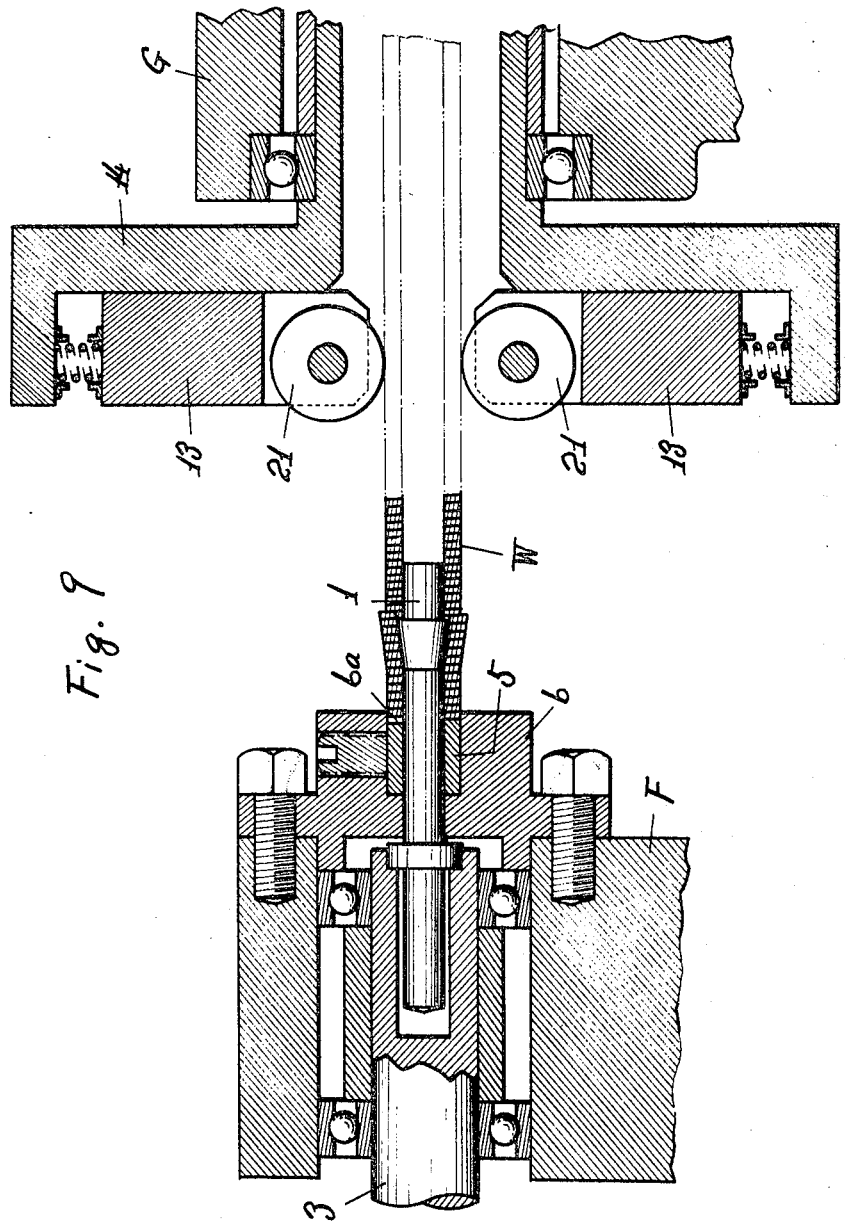

United States Patent Office 3,468,148
Patented Sept. 23, 1969

3,468,148
MACHINES FOR MANUFACTURING
SPRING WASHER
Ichizo Tsurumoto, 68 Koshien guchi, 5-chome, Hyogo
Prefecture, Nishinomiya, Japan
Filed Dec. 17, 1965, Ser. No. 514,619
Claims priority, application Japan, Dec. 18, 1964,
39/71,615
Int. Cl. B21d *53/22;* B21f *11/00, 3/04*
U.S. Cl. 72—132                                4 Claims

ABSTRACT OF THE DISCLOSURE

A machine for manufacturing flat spring washers that includes a rotatable and axially reciprocable spindle having a cylindrical portion and a tapered end portion, a feeding member around and movable axially with the spindle and having a helical surface facing the tapered end portion of the spindle for pushing the flat wire to be wound continuously along the spindle to and over the tapered end portion as the spindle rotates, and a cutting mechanism including an anvil adapted to have the coil pushed thereover upon forward movement of the spindle and a cutter movable toward and away from the anvil in timed relation to the axial reciprocation of the spindle so as to cut the coil into spring washers as the spindle moves forward and the retraction of the spindle allowing the cut washers to fall free of the spindle and anvil.

This invention relates to machines for manufacturing spring washer and more particularly to an improvement of such machines whereby metallic wire of the required section is formed continuously into a coil of the desired shape which is fed into a cutting mechanism where it is cut by each ring continuously to make it into the required spring washer.

According to the known methods of manufacturing spring washer, metallic wire is formed into a coil on a coil-forming machine and then the coil is cut on a separate cutting machine into ring-like units which are then formed into the required shape of spring washers. These methods have invariably suffered from the disadvantage of being inefficient in operation and hence uneconomical.

It has been considered highly desirable therefore to introduce an improved means whereby metallic wire is continuously formed into a coil of the required shape and moreover the coil-forming and coil-cutting operations are made a continuous process. With this in view, the present invention has for an object to provide novel means for manufacturing spring washers continuously by first preparing a coil of the desired shape out of metallic wire of the required section and then cutting it at each turn continuously in timed relation with the feeding of the coil, thus rendering the manufacture of spring washers not only simple and efficient but also continuous.

The following disclosure contains several embodiments of the present invention, of which the first embodiment is characterized as follows: A rotatable spindle is provided with a tapered end portion, around which metallic wire is wound. Mounted about the said spindle is a feeding member having at its one side a bevelled or helical surface which acts to push the wound wire constantly toward the tapered end portion of the said spindle. These elements constitute a coil-forming part which operates, by the coordinate action of the spindle and feeding member, to form the wound wire progressively into a coil of the desired shape. The coiled wire thus produced is guided out of the machine to be cut at each turn into a ring-like unit.

The second embodiment is characterized as follows: A rotatable spindle is provided with a tapered end portion, around which metallic wire of the required section is wound. Mounted about the said spindle is a feeding member having at its one side a bevelled surface which acts to push the wound wire constantly toward the tapered end of the said spindle. These elements constitute a coil-forming part which operates, by the coordinate action of the spindle and feeding member, to form the wound wire progressively into a coil of the desired shape. Provided opposite to the position where the coil is formed is a cutting mechanism which is so designed as to cut the coil at each turn into a ring-like unit.

The third embodiment is characterized as follows: A rotatable spindle is provided with a tapered end portion, around which metallic wire of the required section is wound. Mounted about the said spindle is a feeding member having at its one side a bevelled surface which acts to push the wound wire constantly toward the tapered end of the said spindle. These elements constitute a coil-forming part which operates, by the coordinate action of the spindle and feeding member, to form the wire progressively into a coil of the desired shape. Provided opposite the coil-forming part is an anvil member which is so disposed as to engage in the coil when the latter is moved toward the former. Provided adjacent to the anvil member is a cutting mechanism having a cutter disposed in such a manner as to strike against the said anvil upon each complete rotation. Under this arrangement, the coil is pushed forward to engage over the anvil, whereupon it is cut at each round into a ring form to produce the required spring washer.

The fourth embodiment is characterized as follows: A rotatable spindle is provided with a tapered end portion, around which metallic wire of the required section is wound. Mounted about the said spindle is a feeding member having at its one side a bevelled surface which acts to push the wound wire constantly toward the tapered end portion of the said spindle. These elements constitute a coil-forming part which operates, by the coordinate action of the spindle and feeding member, to form the wound wire progressively into a coil of the desired shape. Provided around the coil-forming part is a means for reciprocating it forward and backward. Opposite the position of the coil-forming part is provided a cutting mechanism which will cut the coil into the desired ring-like units one by one continuously. Under this arrangement, when the coil-forming part is moved forward by the said reciprocating means, the coil is cut at each round into the required ring-like unit, immediately thereupon the coil-forming part is caused to move backward by said reciprocating means.

With the present invention, it has become possible to produce the required spring washers continuously and directly out of a coil of metallic wire, thus making the manufacturing operations extremely simple and efficient. Furthermore, with the modified embodiment of the present invention as described hereinbefore, the operations have been made continuous. Thus, the present invention is suitable also for volume production of spring washers.

The nature and advantages of the present invention will become apparent from the following description taken in connection with the accompanying drawings showing several embodiments of the invention, wherein, FIG. 1 is a side elevation, partly in section, of one embodiment of the present invention.

FIG. 2 is a front elevation of a cutting mechanism of the present invention.

FIG. 3 is a side elevation showing the relation between the main shaft and a spindle.

FIG. 4 is a side elevation of the front part of a sleeve member accommodating the spindle therein.

FIGS. 7 and 9 are side elevations in vertical section of modified embodiments of the present invention.

FIG. 1 shows one embodiment of the present invention. Both F and G are machine frames, the former carrying a coil-forming part and the latter carrying a cutting part.

Figure 8A:
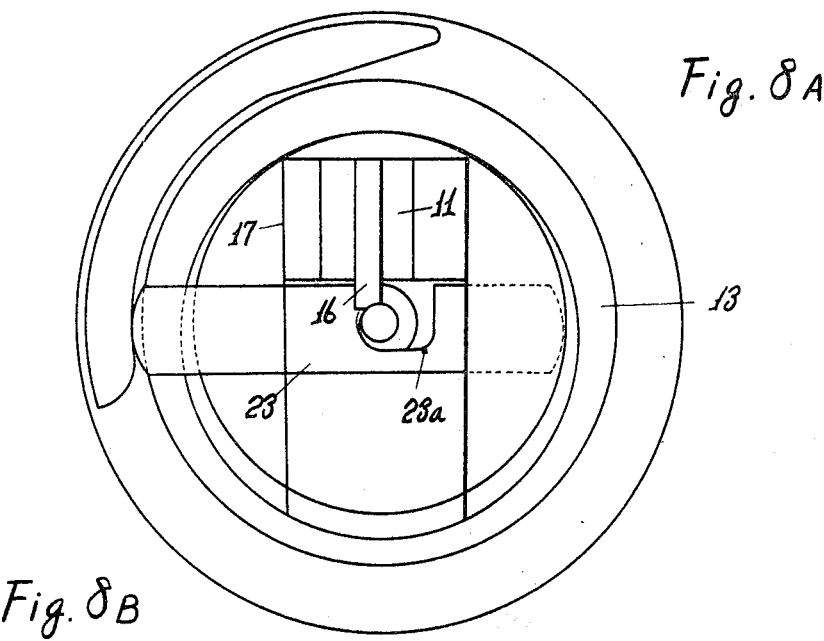
FIG. 8A is a front elevation of the cutting mechanism on an enlarged scale.
Figure 8B:
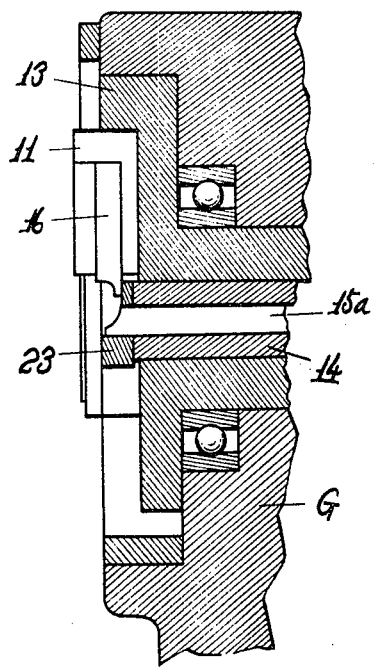
FIG. 8B is a side elevation in vertical section of the cutting mechanism shown in FIG. 8A.

Referring first to the coil-forming part, the numeral 1 denotes a spindle, the numeral 3 denotes a main shaft connected with the said spindle and the numeral 2 denotes a pulley fitted to the tail-end of the said main shaft. The said spindle 1 is so designed as to be driven by the main shaft 3 through the medium of the pulley 2. The said spindle is connected with the main shaft 3 by means of screw fit, taper fit and the like. The said main shaft 3 is rotatably mounted in a sleeve member 6 through the medium of ball bearings. The sleeve member 6 is supported in a bushing 4 in the machine frame F in such a manner that it can move axially and also is led to make a straight lateral motion by means of a key member 7. To one end of the sleeve member 6 is secured a cylindrical cam 9 by means of a set screw 8. The cam 9 which carries a flange 9a is biased at all times by the application of springs 9b so as to roll a roll 12. The roll 12 is held eccentrically on the end of a rotor 14 mounted in the machine frame G, so that the roll may strike vigorously the cam 9 by the rotation of the rotor 14 and thereupon push the flange 9a by expansion and contraction of the springs 9b, making the sleeve member 6 move forward and backward, that is to the right and left as viewed in FIG. 1.

Provided at the front of the rotor 14 is a groove 17, in which a movable member 11 is disposed to move radially, that is transversely of the axis of rotor 14 as well as of the axis of the spindle. This movable member is fitted in an internal cam 13 secured eccentrically to the machine frame G. The rotation of the aforementioned rotor 14 is actuated by a pulley 18 secured to its tail end. It is recommended to make the revolution of this pulley 18 a little slower than that of the other pulley 2 but corresponding to coil-forming speed.

A rod or shank 15a is fitted in the center of the rotor 14. Provided protrudingly at the extreme end of this rod is an anvil member 15 for use in cutting coiled wire. This anvil member 15 serves as a block in cutting coiled wire. The aforementioned movable member 11 carries a cutter 16 whose edge is made to oppose the anvil member 15. Therefore, with the rotation of the rotor 14, the movable member 11 in contact with the interior of the cam 13 makes the stroke, whereupon the cutter 16 makes the stroke toward the anvil member 15 and thus cuts coiled wire coming onto the anvil member ring by ring. At this time, when the aforementioned roll 12 strikes the trough of the flange 9a of the cam 9, the sleeve member 6 advances, whereupon the front end of coiled wire comes onto the anvil member 15 and one ring of the coiled wire is cut off. Then the roll 12 strikes the crest of the flange 9a of the cam 9, whereupon the cam 9 is pushed rearward, the sleeve member 6 retreats, the front end of the coiled wire is disengaged from the anvil member 15 and one ring of the coiled wire just cut off falls down, followed by re-advance of the sleeve member 6. A series of these mechanical works is repeated.

Figure 5:
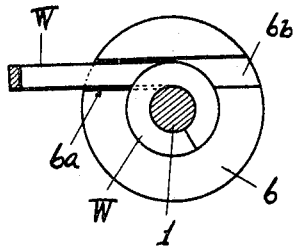
FIG. 5 is a front elevation of the part shown in FIG. 4.
Figure 6:
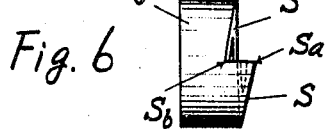
FIG. 6 is a side elevation of a feeding member.

Fitted in the sleeve member 6 is a feeding member 5— refer to FIG. 6—made of either hard alloy or super hard alloy which induces wire to coil. This feeding member is ring-shaped and possesses a bevelled or helical surface formed by apex Sa, base Sb and an inclined plane connecting these Sa and Sb. As is illustrated in FIG. 5, material wire W wound around the spindle is pushed forward by degrees by means of the inclined plane. The spindle carries at its extreme end a taper part t, and the diameter D at the free end of the taper part is made a little larger than the inside diameter of the coil or the inside diameter of a finished spring washer. By means of elastic force of the coil, the coil is made to embrace around the spindle and this embracing force makes it possible to drag in material wire W gradually. In this case, as each ring of the coil comes off the taper part, it loses its elasticity as a part of coiled wire, with the result of a slight reduction of its diameter or the formation of coil of the desired form. In order to facilitate the pushing in of material wire, at the front end of the sleeve member 6 a guide groove 6a is made tangentially in relation to the spindle 1. Structurally, this guide groove 6a is extended toward the opposite side with the formation of a guide groove 6b. This guide groove 6b, however, is not required in actual operation.

Under the above arrangements of the present invention, firstly materal wire W is pushed in as illustrated in FIG. 5, then with the rotation of the spindle 1 material wire W is wound around the rotating spindle 1 and is sent out to the right, passing over the taper t at the extreme end of the spindle being pushed to the right by means of the inclined plane S of the feeding member 5 and thus a coil is formed automatically.

This coil formed at the coil-forming part is gradually pushed to the right, and by means of the action of the cam 9 the sleeve member 6 advances and makes the front end of the coil come onto the anvil member 15, whereupon each ring of the coil is cut off by the cutter 16 so that it is made into a desired spring washer. At this very moment, the front end of the coil retreats, leaving behind a ring just cut off, which ring falls down as a finished washer.

FIG. 7 shows a different embodiment of the invention from that shown in FIG. 1. The device illustrated in FIG. 7 is provided, at the extreme end of the sleeve member 6, with a member 6a to which the feeding member 5 corresponding to the member 5 of FIG. 1 is linked, with another sleeve member 18 mounted on the sleeve member 6. The sleeve member 18 is caused to support a gear 19b to revolve. In this case, it is advisable to make the revolutions of 19a and 19b equal. Also, the sleeve member 18 is provided with a spiral groove 18a, to which a protruding member 6b provided on the sleeve member 6 is fitted.

Under the above arrangement, the sleeve member 6 is induced to move forward and backward to the direction of the shaft by the revolution of the gear 19b, whereupon the spindle 1 is moved forward and backward. Thus, the similar operation to that shown in FIG. 1 is conducted. In this method, it is unnecessary to use a cam 12 as given in FIG. 1.

FIG. 9 shows a further different embodiment of the invention. The difference of this instance from that shown in FIG. 1 is that a coil W ejected from the spindle 1 is drawn out of the tubular spindle 14 as it is held between rollers 21 and 21 which are revolving in front of the spindle 14, and is either coiled up temporarily outside the machine or cut at each round into a spring washer.

The method provided by the present invention enables the machine to carry out continuous delivery and cutting of coil, making the manufacturing of spring washer extremely simple. Thus, it is a very useful invention suitable for volume production of spring washer.

Having thus described the nature of the invention what I claim herein is:

1. A machine for manufacturing spring washer, comprising a spindle rotatably mounted in the machine frame, the said spindle having an elongated cylindrical portion and a tapered end portion around which metallic wire is wound, and a feeding member mounted about the cylindrical portion of said spindle for pushing the wound wire constantly along said cylindrical portion toward the said tapered end of the spindle and said feeding member carrying at its side facing said tapered portion a helical surface for receiving thereon the inner end of the wound wire, both the spindle and the said feeding member constituting a coil-forming means for forming the wound wire into a continuous coil by the cooperable action of the two elements, said coil being guided out of the machine to be cut into ring-like pieces one by one.

2. A machine for manufacturing spring washers including a frame means, a spindle rotatably and axially reciprocably mounted on said frame means, said spindle having a tapered end portion, a feeding member having a helical surface facing said tapered end portions and mounted around said spindle for axial movement with the spindle, said feeding member pushing wire material constantly toward and over said tapered end portion in the form of a coil and a cutting mechanism including an anvil in alignment with said spindle and a cutter movable toward and away from said anvil in timed relation to the axial reciprocation of the spindle so as to cut the coil into washers as the spindle moves toward the anvil and the retraction of the spindle allowing the cut washers to fall free of the spindle and anvil.

3. A machine for manufacturing spring washer, comprising a spindle rotatably mounted in the machine frame, the said spindle having a tapered end portion around which metallic wire is wound, a feeding member mounted about the said spindle for pressing the wound wire toward the said tapered end of the spindle and carrying at its one side a bevelled surface for receiving thereon the inner end of the wound wire, both the spindle and the said feeding member constituting a coil-forming part designed to form the wire into a coil continuously by the cooperable action of the two elements, an anvil member, said coil forming part being mounted for reciprocation toward and away from said anvil member in timed relation to said spindle rotation, said anvil member being located opposite the coil-forming part so as to periodically engage axially in the coil when the coil-forming part moves toward the anvil member during said reciprocation and a cutting mechanism provided adjacent to the said anvil member, the said cutting mechanism comprising a cutter mounted for rotation at generally the same speed as said spindle, a fixed cam disposed in such a manner as to cause said cutter to move toward and strike against the said anvil member upon each complete rotation of the cutter, so that when the coil is pushed forward to engage over the anvil member, it is cut into a ring-form to produce the required spring washer.

4. A machine for manufacturing spring washer, comprising a spindle rotatably mounted in the machine frame, the said spindle having a tapered end portion around which metallic wire is wound, a feeding member mounted about the said spindle for pushing the wound wire constantly toward the said tapered end of the spindle and carrying at its one side a helical surface for receiving thereon the inner end of the wound wire, both the spindle and the said feeding member constituting a coil-forming part designed to continuously form the wire into a coil by the cooperable action of the two elements, a means for reciprocating said coil-forming part forward and backward and a cutting mechanism provided at the forward most position of said coil-forming part opposite the position of the said coil-forming part for cutting the coil into ring-like pieces one by one, said cutting mechanism including an anvil to be received in the end of the coil at each forward movement, and a cutter movable radially of said coil in timed relationship with said forward movement of said coil-forming part whereby portions of said coil are severed to fold away during backward reciprocation of said coil-forming part.

References Cited
UNITED STATES PATENTS

| | | | |
|---|---|---|---|
| 230,123 | 7/1880 | Gale | 72—143 |
| 284,707 | 9/1883 | Armstrong | 72—142 |
| 578,401 | 3/1897 | Gruber | 72—132 |
| 1,497,288 | 6/1924 | Bertrand | 72—132 |

CHARLES W. LANHAM, Primary Examiner

LOWELL A. LARSON, Assistant Examiner

U.S. Cl. X.R.

10—73; 72—142